No. 777,604. PATENTED DEC. 13, 1904.
M. C. COWLES.
GUTTER CLEANER.
APPLICATION FILED MAR. 24, 1904.
NO MODEL.
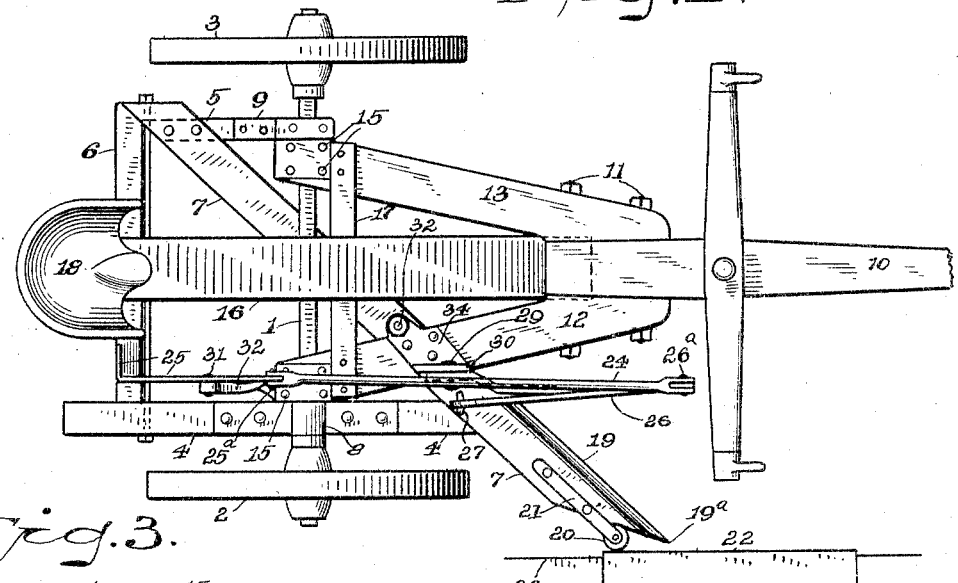
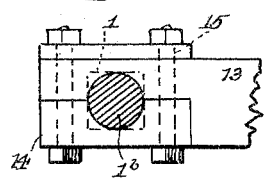
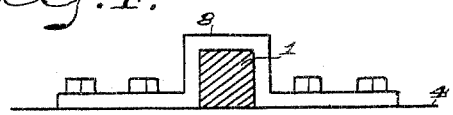
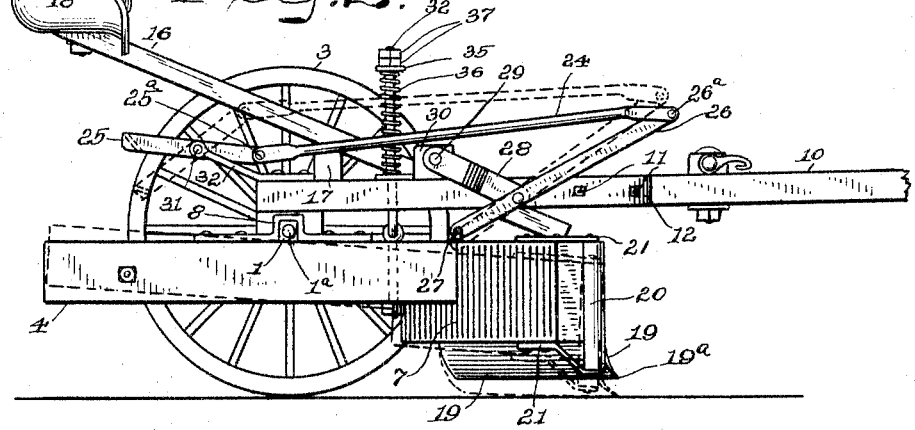
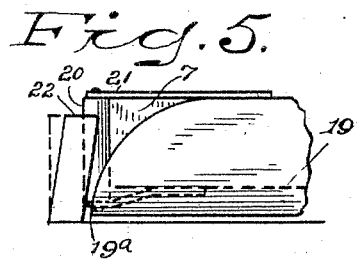
WITNESSES:
H. A. Lamb.
G. W. Finn
INVENTOR
Merle C. Cowles,
BY Geo. D. Phillips,
his ATTORNEY No. 777,604. Patented December 13, 1904.

UNITED STATES PATENT OFFICE.

MERLE C. COWLES, OF BRIDGEPORT, CONNECTICUT.

GUTTER-CLEANER.

SPECIFICATION forming part of Letters Patent No. 777,604, dated December 13, 1904.

Application filed March 24, 1904. Serial No. 199,777. (No model.)

*To all whom it may concern:*

Be it known that I, MERLE C. COWLES, a citizen of the United States, and a resident of Bridgeport, in the county of Fairfield and State of Connecticut, have invented certain new and useful Improvements in Gutter-Cleaners, of which the following is a specification.

My invention relates to road-machines, and is especially adapted for cleaning gutters.

The object of my invention is to effectually clean out snow, ice, dirt, and other debris that will accumulate in gutters and to so construct the machine that the scraper-blade is protected from any unevenness of the gutter by being able to override any obstruction.

To enable others to understand my invention, reference is had to the accompanying drawings, in which—

Figure 1 is an upper plan view of the machine, showing a broken view of the pole, and broken view of the curb, showing the frame carrying the scraper-blade depressed. Fig. 2 is a side elevation of the machine with the hither wheel removed, showing the frame carrying the scraper-blade elevated, also broken view of the pole. Fig. 3 is an enlarged sectional view of the journal on the axle for the hounds and a broken view of one of the hounds journaled thereto. Fig. 4 is an enlarged broken view of one side of the frame and sectional view of the axle, showing the manner of securing the frame to the axle. Fig. 5 is an enlarged broken perspective view of the beam of the frame and scraper-blade, showing the roll-guard to protect the end of the blade.

Its construction and operation are as follows:

1 is the axle; 2 and 3, the wheels. To this axle is rigidly secured a frame comprising the sections 4, 5, 6, and 7. This frame is so secured to the axle that when the axle oscillates in the wheel-hubs the frame will oscillate or tilt with it. The manner of attaching the frame to the axle is immaterial so long as it is made secure thereto. In Figs. 2 and 4 I show the section 4 hung or suspended from the axle by means of the strap 8, bolted to said section. 9 is a similar strap on the opposite section 5, as shown at Fig. 1. When the machine is in motion, the wheels will of course turn on the axle-arms, one of these arms, 1ª, being shown at Fig. 2, and at the same time the frame is at liberty to tilt or oscillate the axle in the hubs of the wheels and being firmly secured to the axle, as before mentioned, will oscillate with it.

10 is the pole, secured by bolts 11 to the hounds 12 and 13. The inner ends of these hounds are journaled on the axle in any suitable manner. As the axle shown is square, the round journal 1ᵇ, Fig. 3, is turned in the body of the axle. The cap 14 is secured to the under side of the hounds by the bolts 15.

16 is an arm fulcrumed on the cross-piece 17 of the hounds. The outer or free end of this arm carries the driver's seat 18, while the inner end projects under said hounds. By this construction the frame is relieved of the driver's weight.

The section 7 of the frame, which may be designated the "scraper-beam," extends beyond the wheel 2 and has secured thereto the scraper-blade 19. This projecting end of the beam will carry the scraper-blade into the gutter while the wheel remains in the street, so that the blade is capable of thoroughly cleaning out the gutter without the wheel coming in contact with the curb. To protect the end of the scraper-blade and prevent its contact with any unevenness of the curb, the roll 20 is set on the end of the beam just forward of the extreme end or point of the blade. This roll is journaled in the brackets 21, projecting from the beam 7. It will be observed, Fig. 5, that the end of the blade drops back and away from the extreme point 19ª of the blade, so that the roll is sure to strike a projecting stone of the curb and spring or throw the machine away sufficient to permit the blade to escape the obstruction. This is fully illustrated at Fig. 1, wherein one end of the curbstone 22 projects slightly beyond the line of the curb 23. Now were it not for the roll 20 the end or point of the blade would strike this projection and be broken. As most of the displaced curbstones project more at the top than at the bottom, (see Fig. 5,) the sheared or cut-away end of the blade places the roll in a prominent position to meet such projecting stones and throw the blade back out of contact. The roll is of the utmost importance in thus guarding the point of the blade, as it will readily ride over any obstruction that the blade would be liable to strike against. With the extreme point of the blade thus safeguarded no caution on the part of the driver is required in locating the blade in its relation to the vertical wall of the curb, as he can without looking swing his team toward the gutter and when the roll strikes the curb simply keep it in contact therewith and drive on.

The frame is tilted on the axle to raise and lower the scraper-blade as follows: 24 is a horizontal connecting-rod pivotally supported at one end to the treadle 25, while the other end is pivoted to one end of the lever 26. The other end of this lever is pivotally supported on the staple 27, which staple is secured to the scraper-beam 7. 28 is a short link having one end pivotally supported on the lever 26, while the other end is pivotally supported on the pin 29 of the bracket 30. The treadle 25 is pivotally supported on the pin or bolt 31 of the bracket 31ª. 32 is a vertical rod secured to the eyebolt 33 of the scraper-beam. This bolt passes freely through the metal plate 34, secured to the hound 12. Between this plate and the washer 35 is placed the spring 36. 37 represents adjusting-nuts to regulate the tension of this spring. When the frame is tilted back, with the scraper-blade in its normal elevated position, the pivotal connection or joint 25ª, Fig. 2, will be below a center line drawn through the joints 25ª, 26ª, and 31. This will effectually lock the frame, so that no amount of jar or weight on the beam 7 will tilt the frame forward to depress the blade. To bring the scraper-blade into action, the free end of the treadle is depressed by the foot of the driver. This will compress the spring 36 and bring the treadle, connecting-rod, and link into the dotted position shown. If the scraper should strike a small obstruction in its path, the spring will throw the frame back sufficient to permit the scraper to override it. If the driver perceives an obstruction that would be likely to injure the scraper-blade or to impede its progress, he simply relieves the pressure on the treadle, and the spring will instantly tilt or oscillate the frame and axle and of course carry the scraper-blade out of harm's way, and when the obstruction is cleared the driver reapplies pressure to the treadle to bring the scraper once more into action, and when the work is finished the pressure is entirely removed from the treadle, and the spring will, as before mentioned, tilt back the frame and lock it with the blade in an elevated position. The scraper-blade being controlled entirely by the foot of the driver, it leaves him the free use of his hands to guide the team and also plenty of opportunity to observe the condition of affairs ahead, and therefore his whole attention can be occupied entirely with these two matters. The only attention required is to apply or release the pressure on the treadle to meet the necessary requirements or conditions of the gutter, and this can be done without looking down at the machine.

While I show the frame secured to the axle, so as to oscillate with it, and the hounds journaled to oscillate on rather than with the axle, I do not wish to be held strictly to this construction, as this arrangement can be reversed by simply journaling the frame on the axle and securing the hounds thereto. The former construction is undoubtedly the best, as it requires less number of bearing-points for the frame and gives a better balance to the whole structure and less weight on the horses. The main thing in either construction is to secure an independent movement or oscillation of the hounds and frame.

Having thus described my invention, what I claim as new, and desire to secure by Letters Patent, is—

1. The combination, in a machine of the character described, having an axle with wheels mounted thereon, comprising a frame suspended from said axle and secured thereto so that, said frame will oscillate with the axle, an angularly-arranged beam secured to said frame and projecting outside of the same, a scraper-blade on the projecting end of said beam, hounds journaled on the axle, a tongue or pole secured to said hounds, mechanism for tilting said frame to depress the scraper-blade, means for automatically tilting back the frame to elevate the blade and lock the frame, for the purpose set forth.

2. The combination, in a machine of the character described having an axle and wheels, comprising a frame carrying an angularly-arranged beam having a projecting end, a scraper-blade on such projecting end, a guard-roll to protect the end of said blade, hounds carrying a pole, said hounds and frame mounted on said axle, one, journaled thereon and the other secured thereto so that, each will have an independent oscillating movement, mechanism for oscillating the frame to lower the forward part of the same and bring the scraper-blade into operative position, a spring for automatically tilting said frame to elevate said blade, temporarily, to overcome any slight obstruction lying in the path of said blade, and also to oscillate said frame and lock it with the blade in an elevated position, for the purpose set forth.

3. The combination, in a machine of the character described having an axle and wheels, comprising a frame carrying a scraper-blade projecting outside of one of said wheels, a guard-roll to protect the outer end of said blade, hounds carrying a pole, said hounds and frame mounted on the axle, one of which is journaled thereon and the other secured thereto so that, each will have an independent oscillating movement, means whereby said frame is oscillated to bring the blade in close proximity to the ground and away therefrom, for the purpose set forth.

4. The combination, in a machine of the character described having an axle and wheels, comprising a frame, a scraper-blade angularly arranged on said frame and projecting laterally outside of one of said wheels, an anti-friction-roll to protect the projecting end of said blade, hounds carrying a pole, said frame and hounds supported on the axle, one of which is secured thereon and the other journaled thereto so that, each will have an independent oscillating or tilting movement, means for actuating said frame to bring said blade into operative position, a spring for automatically actuating said frame to carry said blade out of action, and means for automatically locking said frame when said blade is elevated, for the purpose set forth.

5. The combination, in a machine of the character described having an axle with wheels, comprising a frame carrying a scraper-blade projecting laterally outside of one of said wheels, said blade angularly inclined with respect to the axle, hounds carrying a pole, said frame and hounds supported on the axle, one of which is secured thereto and the other journaled thereon, means, comprising a treadle, connecting-rod and links for bringing the blade into operative position, a spring adapted to be compressed when said blade is lowered, said spring adapted to automatically elevate said blade, means for locking it in its elevated position, for the purpose set forth.

Signed at Bridgeport, in the county of Fairfield and State of Connecticut, this 19th day of March, A. D. 1904.

MERLE C. COWLES.

Witnesses:
F. L. KUTSCHER,
A. L. ADAMS.